US012654654B2

(12) United States Patent
Jeong

(10) Patent No.: US 12,654,654 B2
(45) Date of Patent: Jun. 16, 2026

(54) SENSOR CLEANING CONTROL DEVICE AND METHOD BASED ON RECOGNITION OF SURROUNDING OBJECTS AROUND A VEHICLE

(71) Applicants: HYUNDAI MOTOR COMPANY, Seoul (KR); KIA CORPORATION, Seoul (KR)

(72) Inventor: Heui-Jae Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 213 days.

(21) Appl. No.: 18/516,553

(22) Filed: Nov. 21, 2023

(65) Prior Publication Data

US 2024/0300451 A1 Sep. 12, 2024

(30) Foreign Application Priority Data

Mar. 6, 2023 (KR) ........................ 10-2023-0029141

(51) Int. Cl.
| | |
|---|---|
| *G07C 5/00* | (2006.01) |
| *B60S 1/54* | (2006.01) |
| *B60S 1/56* | (2006.01) |
| *G06V 10/98* | (2022.01) |
| *G06V 20/58* | (2022.01) |
| *G07C 5/02* | (2006.01) |
| *G07C 5/04* | (2006.01) |
| *G07C 5/08* | (2006.01) |

(Continued)

(52) U.S. Cl.
CPC ................... *B60S 1/56* (2013.01); *B60S 1/54* (2013.01); *G06V 10/993* (2022.01); *G06V*

*20/58* (2022.01); *G01S 7/4043* (2021.05); *G01S 2007/4977* (2013.01); *G01S 2007/52011* (2013.01)

(58) Field of Classification Search
CPC ........... B60S 1/56; B60S 1/54; G06V 10/993; G06V 20/58; G01S 7/4043; G01S 2007/4977; G01S 2007/52011
See application file for complete search history.

(56) References Cited

U.S. PATENT DOCUMENTS

| | | | |
|---|---|---|---|
| 10,293,794 B2 | 5/2019 | Mcandrew | |
| 10,518,754 B2* | 12/2019 | Rice ......................... | B60S 1/56 |

(Continued)

FOREIGN PATENT DOCUMENTS

| | | |
|---|---|---|
| WO | 2016083317 A1 | 6/2016 |

*Primary Examiner* — Kito R Robinson
*Assistant Examiner* — Anthony Gabriel Mora
(74) *Attorney, Agent, or Firm* — Lempia Summerfield Katz LLC

(57) ABSTRACT

A sensor cleaning control device and method are based on recognition of surrounding objects around a vehicle. The control device and method are applied to a vehicle and consider an object recognized in scattering areas where contamination occurs due to a fluid sprayed from a nozzle to clean blockages or contamination on sensing portion covers provided at sensors, perform cleaning delay using the washer fluid through nozzle delay spraying by a controller, perform air cleaning not using the washer liquid through nozzle air spraying, and do not perform the cleaning through nozzle non-spraying due to replacement of data of other sensor so that the contamination of the object that is contaminated due to the sensor cleaning is reduced or prevented.

12 Claims, 4 Drawing Sheets

(51) Int. Cl.
>  *G01S 7/40* (2006.01)
>  *G01S 7/497* (2006.01)
>  *G01S 7/52* (2006.01)

(56) References Cited

U.S. PATENT DOCUMENTS

| | | | |
|---|---|---|---|
| 10,703,340 B2 * | 7/2020 | Ghannam | ............ G05D 1/0238 |
| 2017/0259789 A1 | 9/2017 | Mcandrew | |
| 2018/0009418 A1 * | 1/2018 | Newman | ................... B08B 1/16 |
| 2019/0241158 A1 * | 8/2019 | Ghannam | ............ G05D 1/0238 |
| 2020/0331435 A1 * | 10/2020 | Dingli | ........................ B60S 1/56 |
| 2021/0339711 A1 * | 11/2021 | Menicovich | ............. B60S 1/56 |
| 2021/0362688 A1 * | 11/2021 | Kawamura | ............. B60S 1/486 |
| 2023/0286467 A1 * | 9/2023 | Obayashi | .................. B60S 1/52 |
| 2023/0406268 A1 * | 12/2023 | Zou | ......................... B60S 1/481 |
| 2024/0101070 A1 * | 3/2024 | Inoue | ....................... B60S 1/52 |

* cited by examiner

FIG. 4

SENSOR CLEANING CONTROL DEVICE AND METHOD BASED ON RECOGNITION OF SURROUNDING OBJECTS AROUND A VEHICLE

CROSS-REFERENCE(S) TO RELATED APPLICATIONS

This application claims priority to Korean Patent Application No. 10-2023-0029141, filed on Mar. 6, 2023, which is incorporated herein by reference in its entirety.

BACKGROUND

Technical Field

Embodiments of the present disclosure relate to sensor cleaning control applied to a vehicle, and more particularly, to a sensor cleaning control device and method based on recognition of surrounding objects around a vehicle. The device and method preform cleaning delay by controlling a nozzle spraying operation with respect to a sensor when an object is identified in a scattering area of a nozzle.

Description of Related Art

Generally, vehicles are equipped with a plurality of cameras and sensors which provide external views of the front, rear, and sides of the vehicles in order to improve a driver's field of view and safety due to blind spots that cannot be covered by and viewed from the mirrors.

Therefore, since the cameras and the sensors are exposed to the surroundings of the vehicle, filth, debris, mud, salt, and the like are accumulated on surfaces of lenses and sensors while the vehicle is driving. These foreign materials, i.e., contaminants, inevitably degrade the external views.

Thus, the vehicle is further equipped with a sensor cleaning system for cleaning the lenses and the sensors in addition to the existing windshield glass wiper/washer system.

As an example, the sensor cleaning system includes a nozzle assembly with a nozzle for spraying a cleaning fluid and operates the nozzle to directly spray the cleaning fluid onto surfaces of lenses and sensors, which will be cleaned or are to be cleaned.

In particular, in addition to the existing windshield glass wiper/washer system, an autonomous driving vehicle (e.g., a LV3 or higher vehicle) includes a sensor cleaning system, such as a washer liquid/air spraying type cleaning system as a cleaning system, for cleaning camera sensors capable of recognizing shapes and colors among various sensors mounted on an outer side of the autonomous driving vehicle.

As one example, the washer liquid/air spraying type cleaning system sprays a fluid (e.g., washer liquid and/or air) at high pressure onto a surface of a camera sensor to remove a blockage (i.e., a contaminant that is on or stains the surface of the camera sensor to prevent object recognition) from the surface of the camera sensor through the spraying.

When the fluid (washer liquid/air) spraying type cleaning system operates to remove a contaminant, the fluid (washer fluid and air) sprayed from the nozzle is scattered to the surroundings together with the contaminant. Thus, a problem of contaminating surrounding objects may be caused. These potentially contaminated objects may include people, animals, bicycles, powered two-wheelers (PTWs), other vehicles, and the like, which are located in the surroundings outside the vehicle.

The contamination problems for the contaminated objects can be improved by changing a nozzle position in order to direct a scattering direction of the fluid (washer fluid and air) of the nozzle to a downward direction of the vehicle. However, this nozzle position change method is improved when a position of the camera is a bumper position, but in the case of a sensor positioned at a significantly high position such as an upper end of a roof, even when the scattering direction is simply directed downward, there is an inevitable limitation in avoiding contamination of person/bicycles/other vehicles around the vehicle.

Furthermore, there inevitably occur cases in which it is difficult to direct both air and a washer liquid downward to clean because of a camera being miniaturized, or it is impossible to place the nozzle at a downward position due to a recognition characteristic of the sensor.

In particular, considering that it is essential to remove a contaminant by a nozzle spraying operation in order to maintain a clean state of the sensor always in the advanced level of autonomous driving, regarding the problem of contamination of other vehicles, person, and bicycles by a fluid (especially a washer liquid) and a contaminant inevitably is expected to become a major issue.

SUMMARY

An embodiment of the present disclosure is directed to providing a sensor cleaning control device and a sensor cleaning control method based on recognition of surrounding objects around a vehicle, which perform cleaning delay on a contaminated sensor when a contaminated object is identified in a scattering area of a nozzle and, particularly, are capable of varying a degree of the cleaning delay by discriminating a contaminated objects into a person, an animal, a bicycle, a powered two-wheeler (PTW), or other vehicle.

Other objects and advantages of the present disclosure can be understood by the following description and become apparent with reference to the embodiments of the present disclosure. Also, it should be apparent to those of ordinary skill in the art to which the present disclosure pertains that the objects and advantages of the present disclosure can be realized by the means as claimed and combinations thereof.

In accordance with an embodiment of the present disclosure, there is provided a sensor cleaning control device based on recognition of surrounding objects around a vehicle, which includes one or more sensors installed toward the outside of a vehicle and configured to detect an external object of the vehicle, a surrounding environment, or a vehicle status; sensing portion covers provided on the one or more sensors; a nozzle configured to spray a fluid for performing cleaning; and when a blockage is detected on the sensing portion cover, a controller configured to recognize the external object of the vehicle and perform cleaning control for the blockage according to the external object.

As an embodiment, when a position of the external object is determined to be inside a scattering area where the sprayed fluid is scattered, the external object may be defined as an object that may be contaminated, and cleaning delay may be performed.

As an embodiment, when the location of the vehicle is on a vehicle-only road, the cleaning may be performed, whereas when the location of the vehicle is not in the vehicle-only road and the object that may be contaminated is no other vehicle, the cleaning delay may be performed.

As an embodiment, during the cleaning delay, air cleaning may be performed while a speed of the vehicle is reduced.

As an embodiment, during the cleaning, when it is determined that it is dangerous to reduce the speed of the vehicle, the air cleaning may be performed while maintaining the speed of the vehicle.

As an embodiment, the controller may determine the scattering area and whether the object that may be contaminated is present by a sensor other than the sensor where the blockage is detected on the sensing portion cover and determine whether to perform the cleaning or the cleaning delay.

As an embodiment, when the data of the sensor where the blockage is detected on the sensing portion cover may be replaced with data of a sensor other than the sensor where the blockage is detected on the sensing portion cover, the sensor where the blockage is detected on the sensing portion cover may be replaced with data of the other sensor.

As an embodiment, when the data of the sensor where the blockage is detected on the sensing portion cover is not replaced with the data of the sensor other than the sensor where the blockage is detected on the sensing portion cover, the air cleaning may be performed.

As an embodiment, any one among a camera sensor, a radio detecting and ranging (RADAR), light detecting and ranging (LIDAR), an imaging device, and an ultrasound generator may be utilized as the sensor.

As an embodiment, the external object may be classified as any one among a person, an animal, a bicycle, a PTW, and other vehicle.

In accordance with an embodiment of the present disclosure, there is provided a sensor cleaning control method based on recognition of surrounding objects around a vehicle, which includes when a blockage of a sensing portion cover provided on a sensor is recognized by a controller, determining necessity for cleaning in order to remove the blockage; and when an object that may be contaminated is present in a cleaning scattering area, controlling cleaning delay.

As an embodiment, when a location of the vehicle is on a vehicle-only road or the object that may be contaminated is other vehicle, the cleaning may be performed.

As an embodiment, when the location of the vehicle is not in the vehicle-only road and the object that may be contaminated is not the other vehicle, the cleaning delay may be performed.

As an embodiment, the controller may determine the scattering area and whether the object that may be contaminated is present by a sensor other than the sensor where the blockage is detected on the sensing portion cover and determine whether to perform the cleaning or the cleaning delay.

As an embodiment, when the data of the sensor where the blockage is detected on the sensing portion cover may be replaced with data of a sensor other than the sensor where the blockage is detected on the sensing portion cover, the sensor where the blockage is detected on the sensing portion cover may be replaced with the other sensor.

As an embodiment, when the data of the sensor where the blockage is detected on the sensing portion cover is not replaced with the data of the sensor other than the sensor where the blockage is detected on the sensing portion cover, the air cleaning may be performed.

BRIEF DESCRIPTION OF THE DRAWINGS

FIG. 4 is a diagram illustrating an example of nozzle cleaning based on recognition of surrounding objects around the vehicle according to the present disclosure.

DESCRIPTION OF SPECIFIC EMBODIMENTS

Embodiments of the present disclosure are described below in more detail with reference to the accompanying drawings. These embodiments are examples of the present disclosure and may be embodied in various other different forms by those of ordinary skill in the art to which the present disclosure pertains so that the present disclosure is not limited to these embodiments.

Figure 1:
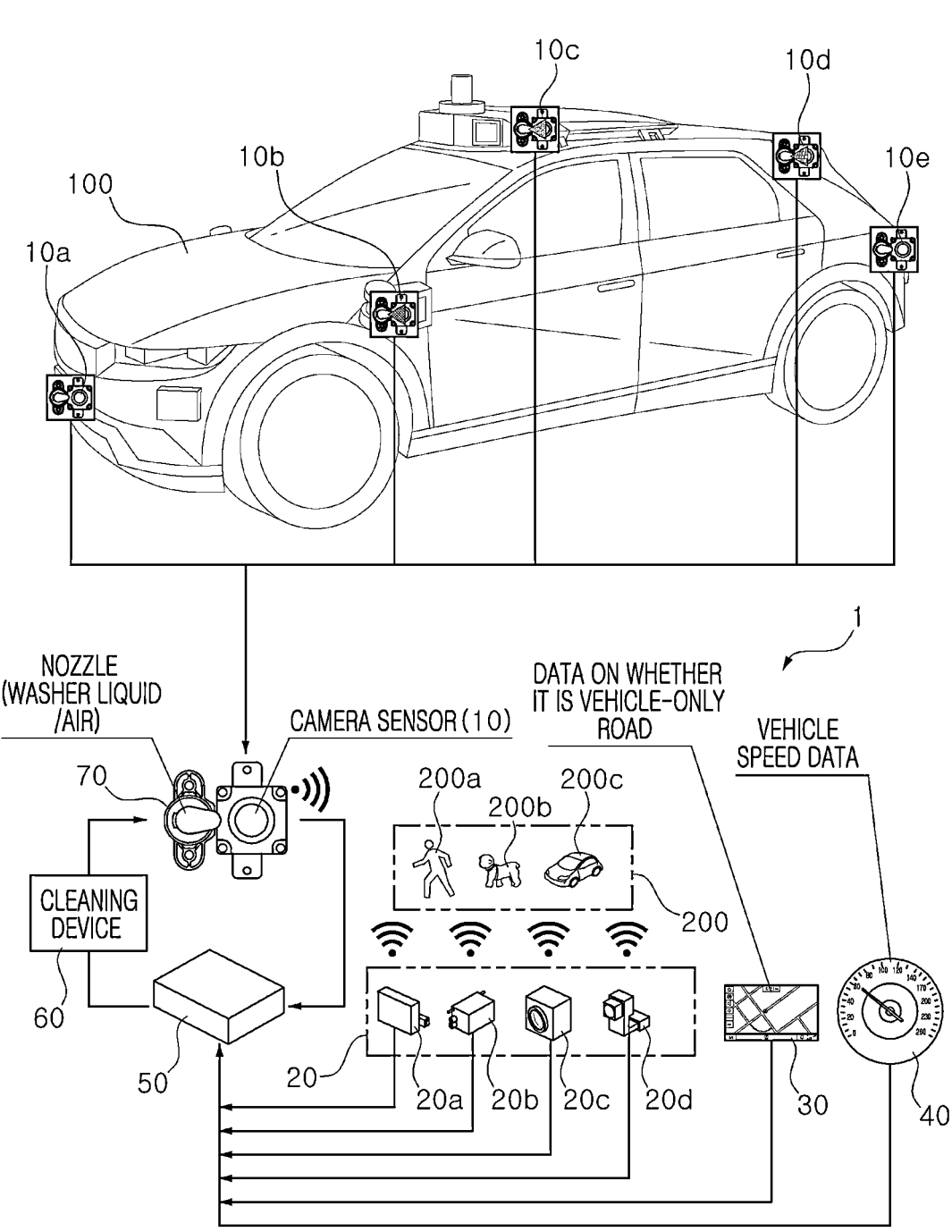
FIG. 1 is a configurational diagram illustrating a sensor cleaning control device applied to a vehicle according to the present disclosure.

Referring to FIG. 1, a sensor cleaning control device 1 applied to a vehicle 100 includes sensors 10 and 20, a vehicle position detector 30, a vehicle speed detector 40, a controller 50, a cleaning device 60, and a nozzle 70.

In particular, the sensor cleaning control device 1 includes the sensor 10 as a camera sensor. The sensor 10 may be equally applied to a light detecting and ranging (LIDAR). The camera/sensor may be located inside of a windshield or other transparent object, may be equally applied to an automated cleaning system including auto wiping, and may be exposed towards the outside of the vehicle 100 in order to recognize the vehicle surroundings.

Specifically, the sensors 10 and 20 each include a sensing portion cover (i.e., a case for protecting inside parts) configured to protect an internal sensor module for detecting an external object 200 of a vehicle 100, a surrounding environment, and a vehicle state. The sensing portion cover may be provided at a sensor on which a blockage (i.e., a contaminant) resides. The sensors 10 and 20 may include a camera sensor 10 and an external object detection sensor 20 including the camera sensor 10.

Hereinafter, an external object, which is included in the scattering area, is defined as an object that may be contaminated by the spraying and scattering of the washer fluid. The fluid is a washer liquid and air and cleaning is washer liquid cleaning and/or air cleaning.

As one example, the camera sensor 10 may include a front camera sensor 10a exposed to the outside from a front surface of a front bumper of the vehicle 100. The camera sensor 10 may also include front side camera sensors 10b of left/right side surfaces exposed to the outside surface from an A pillar portion of the vehicle 100. The camera sensors 10 may also include a roof top camera sensor 10c exposed to the outside from an upper portion of the roof top of the vehicle 100. The camera sensors 10 may also include roof rear side camera sensors 10d of left/right side surfaces exposed to the outside surface from a C pillar portion or the roof top upper surface of the vehicle 100. The camera sensors 10 may also include a rear bumper camera sensor 10e exposed to the outside from a surface of a rear bumper of the vehicle 100.

The external object detection sensor 20 includes or encompasses the camera sensors 10, 10a, 10b, 10c, 10d, and 10e, and these sensors are generally identified herein as the camera sensors 10. The external object detection sensor 20 may perform functions of any one or more contaminated camera sensors among external object detection sensors, including other camera sensors, when a specific camera sensor is contaminated. The external object detection object detection sensor 20 may also check whether an object that may be contaminated by the spraying and scattering of fluid is present in a scattering area.

In addition to the camera sensors 10, the external object detection sensor 20 includes a radio detecting and ranging (RADAR) 20a configured to measure a distance to the external object 200 and a LIDAR 20b configured to detect the distance to the external object 200 and a shape thereof. The external object detection sensor 20 also includes an imaging device 20c configured to recognize the shape and a color of the external object 200 as an image and an ultrasound generator 20d configured to measure the distance to the external object 200 using ultrasound. In this case, the sensor means a device in an assembled state that may include a sensing part and another part or parts integrated for normal operation.

As one example, when a current driving road location of the vehicle 100 is a vehicle-only road, such as a highway using map information DATA, rapid cleaning may be performed by normal operation of the sensor cleaning system to spray fluid via a nozzle. To this end, navigation may be applied. This is because the object that may be contaminated is another vehicle driving on the vehicle-only road. Thus, scattering of a fluid (especially, a washer liquid) is not a big problem.

When the current driving road location of the vehicle 100 is not the vehicle-only road such as the highway using the map information DATA, the system checks whether an object that may be contaminated is present in the scattering area of the fluid (especially, the washer liquid).

When it is determined that the sprayed fluid (especially, the washer liquid) and/or any sensor contaminants, i.e., a blockage, may be scattered onto a nearby person due to the sensor cleaning, the controller 50 reduces a speed of the vehicle 100 and performs air cleaning based on a current speed of the vehicle 100. Alternatively, when it is impossible to reduce the speed of the vehicle 100, the controller 50 changes a spraying fluid from the washer liquid to air and performs nozzle air spraying (air cleaning), thereby minimizing possible contamination with respect to an object that may be contaminated as a result. To this end, a speedometer mounted on an instrument cluster may be applied as the vehicle speed detector 40.

As one example, the controller 50 detects a blockage contaminating the sensing portion cover of the camera sensor 10 and controls spraying of a fluid (i.e., a washer liquid or air) of the nozzle 70 connected to the cleaning device 60.

In particular, before performing the cleaning for the camera sensor where a blockage is detected, the controller 50 may acquire and analyze data on whether an object that may be contaminated is present in the scattering area. The controller 50 may do so using any one or more among other sensors including the RADAR 20a, the LIDAR 20b, the imaging device 20c, and/or the ultrasound generator 20d, which are mounted on the vehicle 100. The controller 50 determines whether to perform the cleaning for the camera sensor where the blockage is detected on the basis of the analyzed result. Contamination of the object in the scattering area that may be contaminated by the fluid (especially, the washer liquid) and the contaminant, i.e., blockage material, which are scattered during an operation of the cleaning system may be minimized.

When it is determined that contamination of an object in the scattering area that may be contaminated is unavoidable, the cleaning may be performed by reducing a vehicle speed.

When the vehicle speed is reduced, cleaning using a fluid (especially, a washer liquid) or air cleaning is possible. When it is difficult for a driving environment to reduce the vehicle speed during driving, only the air cleaning may be used.

The controller 50 recognizes a scattering area 80 (see FIG. 2) and the external object 200 by sensors other than the sensor where the blockage is detected on the sensing portion cover. Thus, the controller 50 determines whether to spray the fluid (especially, the washer fluid) through surrounding traffic based on the vehicle position detector 30, determines cleaning delay by nozzle delay spraying according to whether a speed of the vehicle 100 may be reduced based on the vehicle speed detector 40, or determines nozzle air spraying when it is impossible to reduce the speed of the vehicle 100. Furthermore, when the data of any contaminated sensor (e.g., the camera sensor 10) is replaced with data of other sensors, the controller 50 does not perform the nozzle spraying in order to prevent the contamination of an object in the spray scattering area that may be contaminated.

Therefore, the controller 50 may perform a cleaning operation using the fluid (especially, the washer fluid) when an object that could be contaminated is not present in the scattering area. The controller 50 may perform nozzle non-spraying, i.e., prevent spraying, in which the cleaning is not performed due to the replacement of the function of the contaminated sensor with other non-contaminated sensors, when an object that may be contaminated is recognized in the scattering area. The controller 50 may perform nozzle spraying in which the cleaning is rapidly performed using the fluid (especially, the washer liquid) when the vehicle 100 is on a vehicle-only road. The controller 50 may perform nozzle spraying delay, i.e., delay spraying, in which the cleaning using the fluid (especially, the washer liquid) or fluid (i.e., air) cleaning is performed after adjusting an operating time by the reduction of the vehicle speed. The controller 50 may perform air cleaning in which only air is sprayed instead of the washer liquid when the vehicle speed cannot be reduced.

In particular, examples of the case in which the vehicle speed cannot be reduced may include a speed of an object that may be contaminated in the scattering area, a surrounding environment such as a minimum speed limit zone, and a vehicle state such as the lack of fuel.

As one example, the cleaning device 60 includes a reservoir containing a fluid (i.e., a washer liquid), a washer pump configured to pump and spray the fluid (i.e., the washer liquid), an air pump configured to spray air, a washer hose and an air hose that are connected to the nozzle 70, and other necessary devices are the same as a configuration of the existing cleaning device. Each sensor 10 and/or camera may have its own dedicated nozzle 70.

As one example, the nozzle 70 is arranged at a place in the vicinity of the camera sensor 10 and/or the LIDAR 20b. The nozzle 70 is connected to the cleaning device 60 through the washer hose and the air hose. Selecting the washer liquid and/or the air, which is a fluid sprayed from the cleaning device 60, may be performed to spray the selected fluid and/or air toward the sensing portion cover.

Thus, the nozzle 70 is disposed such that a nozzle inlet faces the camera sensor 10 and/or the sensing portion cover of the LIDAR 20b. A contaminant or blockage on the surface of the sensing portion cover may thereby be removed using a spraying pressure and speed.

Figure 2:
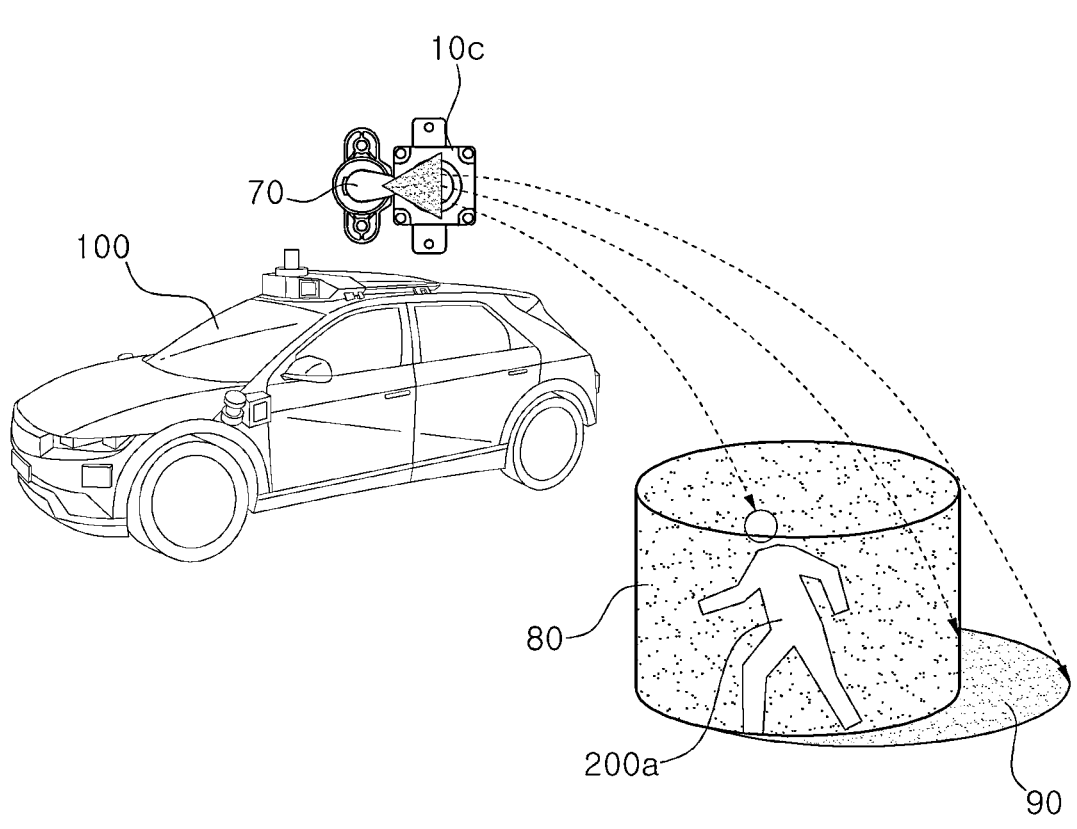
FIG. 2 is a diagram illustrating an example of a nozzle scattering area for aa surrounding object around the vehicle according to the present disclosure.

FIG. 2 shows an example of a fluid (i.e., a washer liquid) scattering area in which a person 200a is depicted as an object that may be contaminated due to scattering of the fluid (i.e., a washer liquid) and/or a contaminant or blockage material according to the spraying pressure and speed of the fluid ejected or sprayed from the nozzle 70.

As shown in the drawing, a washer fluid scattering area and an air scattering area are defined as a three-dimensional (3D) scattering area 80 and a two-dimensional (2D) scattering area 90. The scattering areas 80, 90 are established by determining scattering areas during a cleaning operation of each sensor through evaluation and simulation during development of a vehicle.

As one example, the 3D scattering area 80 is an area in which the washer liquid and/or the air, which is sprayed during washer nozzle spraying and/or air nozzle spraying, collides with a sensor surface to be cleaned. The sprayed fluid is then scattered by the collision with the surface into the surroundings. The 3D scattering area 80 is defined three-dimensionally as a cylindrical area including the person 200a. The 2D scattering area 90 is defined two-dimensionally as a circular area where the person 200a is positioned on the ground.

Therefore, the 2D scattering area 90 may be used by defining an area two-dimensionally on the ground in a system where the computing capability is insufficient or when a sufficiently fast determination is not made during the 3D definition.

In particular, a scatter distance of the washer liquid and/or the air, which is the fluid, becomes shorter or longer according to the spraying pressure and speed of the nozzle 70. Thus, each scattering area may only overlap or be similar to a recognition area by a camera (sensor) where the scattering occurs. This may be insignificant.

Figure 3:
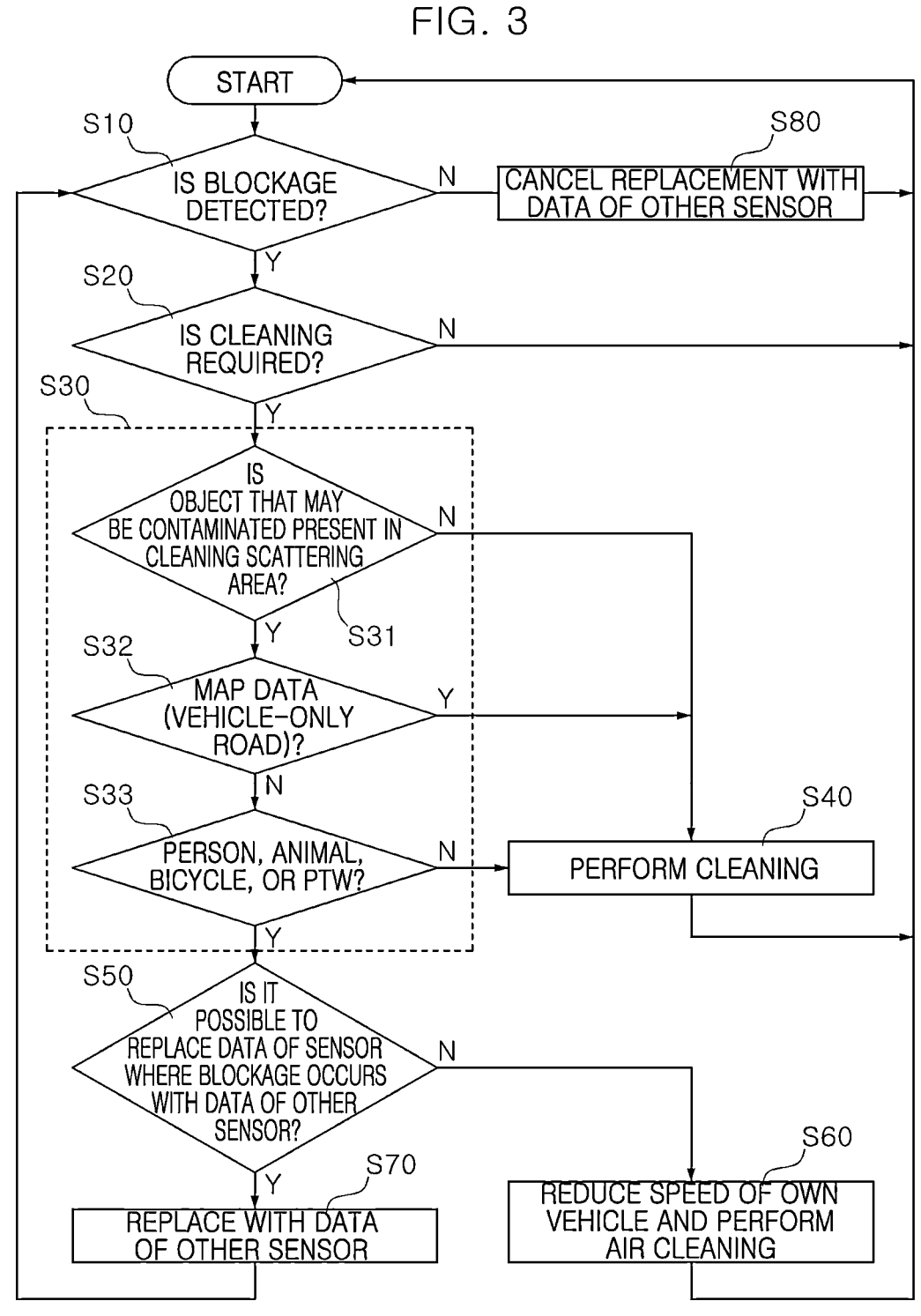
FIG. 3 is a flowchart illustrating a cleaning control method using the sensor cleaning control device according to the present disclosure.

Meanwhile, referring to FIG. 3, one example of a cleaning control method is depicted using the sensor cleaning control device based on recognition of a surrounding object in a scattering area. In this case, a control main body is the controller 50, control targets are the nozzle 70 and the cleaning device 60 (i.e., a washer pump and an air pump), and a blockage is a contaminant.

Specifically, the cleaning control method is performed by determining the need for cleaning (S20) through detecting a blockage (S10). If cleaning is required (S20), the system checks whether an object is present in a scattering area of a fluid (i.e., a washer liquid) that would be scattered due to nozzle spraying (S30). The system may then perform cleaning by nozzle spraying using the fluid (i.e., the washer liquid) (S40).

When the cleaning operation (S40) cannot be performed, the procedure is switched to cleaning delay.

The cleaning delay occurs in situations in which the cleaning operation (S40) cannot be performed immediately. These situations may include a series of processes of determining information about the vehicle or the vehicle surroundings. These situations may include whether an object that may be contaminated is present in a cleaning scattering area (S31), determining whether the vehicle is driving on a vehicle-only road (S32), determining whether an object that may be contaminated is present and is a person, animal, bicycle, or powered two-wheeler (PTW) (S33), and/or checking the possibility of using other sensors for replacing data of a contaminated sensor (S50). In this case, the cleaning delay means a time delay intended to allow a detected object that may be contaminated to escape the scattering area.

The cleaning delay may be implemented in a variety of ways or a combination of ways, after the checking of the possibility of using other sensors for replacing the data of the contaminated sensor (S50). The cleaning delay may include performing the cleaning using the fluid (especially, the washer fluid) through nozzle spraying delay, i.e., delay spraying, when a speed of the vehicle is reduced. The cleaning delay may include performing the cleaning using air through nozzle air spraying in which the sprayed fluid is changed from the washer fluid to the air when the speed of the vehicle cannot be reduced (S60). The cleaning delay may include, when the data of the contaminated sensor may be replaced by data of the other sensors (S70), not performing the cleaning, i.e., prevent spraying through nozzle or initiate nozzle non-spraying, and canceling sensor data replacement (S80) when a blockage is not detected by the other sensors (N in S10). In other words, the cleaning delay means delay due to a hardware operation of utilizing alternative sensors or replacing the liquid cleaning with air cleaning.

Meanwhile, detection of a blockage (S10) is checked by the camera sensor 10. The requirement of cleaning (S20) is a state in which the sensing portion cover of the camera sensor 10 is contaminated with a blockage. In this case, detection and recognition of the blockage (i.e., a contaminant) of the sensing portion cover may be performed based on a degree of defective data of each of the contaminated sensor.

Specifically, checking the contamination status of an object that may be contaminated (S30) is performed through divided operations including determining whether an object that may be contaminated is present (S31), determining whether the vehicle is driving on a vehicle-only road (S32), and detecting an object that may be contaminated (S33).

As one example, determining whether an object that may be contaminated is present (S31) includes determining whether an object that may be contaminated is present in the cleaning scattering area. Determining whether the vehicle 100 is present on a vehicle-only road (S32) includes determining whether a place at which an object that may be contaminated is present is on the vehicle-only road from the map information DATA of a navigation device, which is the vehicle position detector 30. Detecting the external object (S33) includes checking whether the object that may be contaminated, which is determined as being present, corresponds to any one among a person 200a, an animal 200b, and another vehicle 200c as the external object 200, which are recognized by the sensors 10, 20a, 20b, 20c, and 20d. The objects that may be contaminated are limited to data about objects and which are already recognizable by the system.

Figure 4:
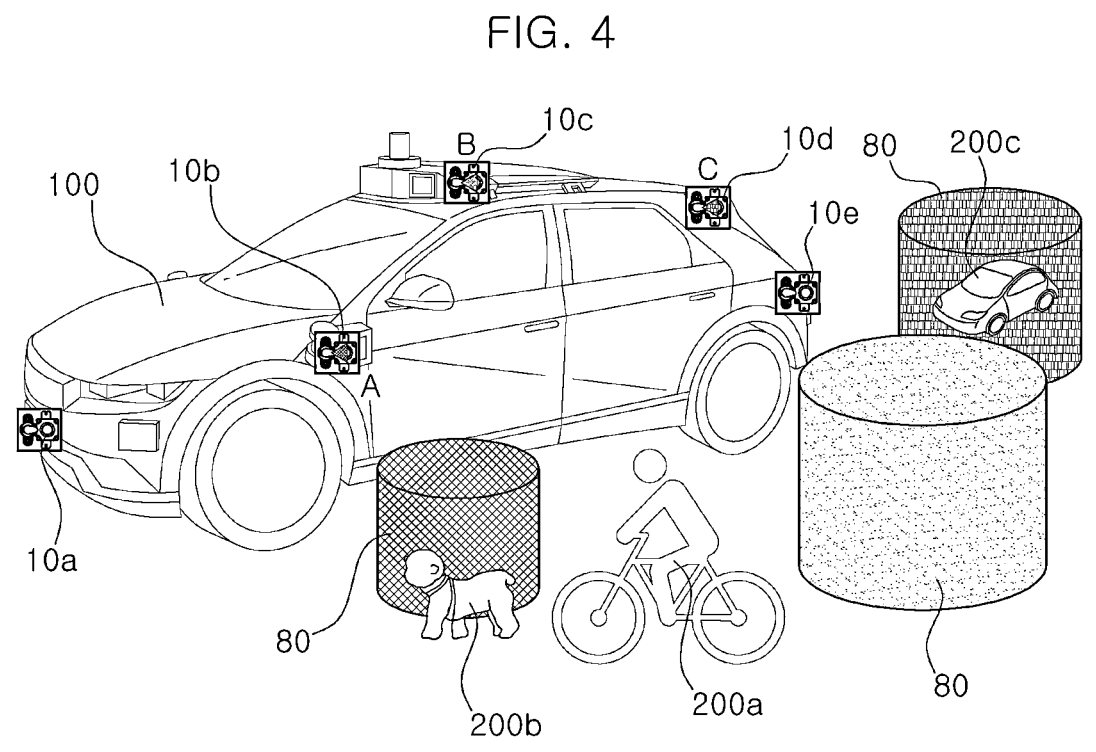

Referring to FIG. 4, during checking of the contamination status of an object that may be contaminated (S30), the system checks for specific objects that may be contaminated in the scattering area (S33).

As shown in the drawing, an example is illustrated in which objects that may be contaminated are recognized as being present in the cleaning scattering area around the vehicle 100. The objects that may be contaminated in the scattering area may be recognized as a person 200a, an animal 200b, a bicycle, a PTW, and another vehicle 200c through the camera sensor 10, the RADAR 20a, the LIDAR 20b, the imaging device 20c, and the ultrasound generator 20d in the vehicle 100. Such objects that may become contaminated in the scattering area may include other such objects and need not be limited to or include only these depicted and mentioned objects.

The nozzle 70 with respect to the sensing portion covers of the front bumper camera sensor 10a, the front side camera sensor 10b, the roof top camera sensor 10c, the rear side camera sensors 10d, and the rear bumper camera sensor 10e may be operated to perform cleaning (S40). However, an animal 200*b* and another vehicle 200*c*, which are present in the 3D scattering area 80, may be contaminated with a fluid (i.e., a washer liquid and/or air) in FIG. 4.

For example, by way of example, one may assume that a blockage via contamination occurs on the front side camera sensor 10*b* (A), the roof top camera sensor 10*c* (B), and the rear side camera sensors 10*d* (C) among the plurality of external cameras installed in the vehicle 100. In such an example, since the animal 200*b* (e.g., a dog) is present in the 3D scattering area 80, which is the scattering area of the front side camera sensor 10*b* (A), the nozzle spraying may be delayed, which delays the cleaning operation using the fluid (especially, the washer liquid). Alternatively, if the cleaning should be performed quickly, the air cleaning through the nozzle via air spraying, which performs the cleaning operation using air instead of the washer liquid, may be performed first.

On the other hand, since there is no need to worry about contamination of the other vehicle 200*c* in FIG. 4 in the 3D scattering area 80, which is the scattering area of the rear side camera sensors 10*d* (C), cleaning may be performed using the fluid (i.e., the washer liquid). In addition, since there is no object present in the 3D scattering area 80, which is the scattering area of the roof top camera sensor 10*c* (B), the cleaning is performed using the washer liquid.

As described above, when objects that may be contaminated in the scattering area are a person, an animal, a bicycle, and/or a PTW, before performing the cleaning (S40), the controller 50 switches to not performing the nozzle spraying (S50, S70, and S80), or switches the cleaning (S50 and S60) to delay the spraying operation through the nozzle, i.e., delay spraying or switches air spraying through the nozzle instead of immediately performing the cleaning (S40) with liquid. Thus, contamination of objects that may be contaminated in the scattering zone may be minimized.

As one example, performing the cleaning (S40) removes the blockage or contaminants from the contaminated sensor by spraying through the nozzle the fluid (especially, the washer liquid). The cleaning is performed in a condition in which objects that may be contaminated are not present in the cleaning scattering area (S31), in a condition in which objects that may be contaminated are present in the scattering area and the vehicle 100 is driving on a vehicle-only road (S32), and in a condition in which objects that may be contaminated are not a person 200*a*, an animal 200*b*, a bicycle, a PTW, or another vehicle 200*c* (S33).

After checking the possibility of using other sensors in S50, the cleaning delay is performed by performing the air spraying cleaning in S60 (N in S50) or the replacing the data with data from other sensors in S70 (Y in S50).

On the other hand, after replacing the data with data from other sensors in S70, when the blockage previously detected in S10 is not detected, the replacement of the data from the other sensor is canceled in S80 and the original sensor is restored.

In checking the possibility of using other sensors (S50), when an object that may be contaminated is a person, an animal, a bicycle or a PTW, the system checks whether data from other sensors may replace the data provided by the contaminated sensor that is contaminated with a blockage, i.e., contaminants. Then the data of the contaminated sensor may be replaced with the data from the other sensor or sensors. When it is not possible to replace the data with data from the other sensor or sensors, the air cleaning is performed and the vehicle speed is reduced, as necessary.

For example, when a sensor where the blockage is detected is the roof top camera sensor 10*c*, either the front bumper camera sensor 10*a* or the rear bumper camera sensor 10*e*, either of which include most of the data of the roof top camera sensor 10*c*, may be selected first. Then the front side camera sensor 10*b* or the rear side camera sensor 10*d* may be selected, as needed.

As a result, when there is no other sensor capable of replacing the data provided by the sensor where the blockage is detected (S50), the procedure enters performing the cleaning delay (S60).

Specifically, the performing of the cleaning delay (S60) is then performed either through the delayed nozzle spraying or the nozzle air spraying.

As one example, in the delayed nozzle spraying, a current driving speed of the vehicle 100 is checked through the vehicle speed detector 40. The speed of the vehicle 100 is reduced in consideration of the surrounding traffic, and then cleaning using the fluid (i.e., the washer liquid) is performed to remove the blockage or contamination from the contaminated sensor. In addition, in the nozzle air spraying, when the reduction in speed of the vehicle 100 is impossible due to the speed of the external object and/or conditions in which the surrounding environment has a minimum speed limit zone, and/or the vehicle 100 is in a state of insufficient fuel, the blockage is removed by performing the cleaning using air through the nozzle, i.e., air spraying in which the sprayed fluid is changed from the washer liquid to air.

Meanwhile, when there is another sensor capable of replacing the data provided by the sensor detected to have the blockage (S50), the procedure switches to the nozzle non-spraying condition in which the cleaning in S70 and S80 is not performed.

As one example, the nozzle non-spraying condition (S70 and S80) is performed by using the data of the other sensor (S70), by checking whether the blockage is detected for the other sensor (S10), and by canceling the replacement of data from the other sensor (S80).

Therefore, when a blockage is also detected on the other sensor, the nozzle non-spraying condition (S70 and S80) results in the above-described operations S20 to S70 being performed again. Conversely, when a blockage is not detected on the other sensor, the cleaning operation is terminated through canceling the replacement of the data from the other sensor (S80).

As described above, an object that may be contaminated may be recognized in the scattering areas 80 and 90 where contaminations may occur due to the fluid (especially, the washer liquid) sprayed from the nozzle 70 scattering when contaminants or blockages are removed from the sensing portion covers provided at the sensors 10 and 20. The cleaning operation variable control, based on recognition of such surrounding objects using the sensor cleaning control device 1 applied to the vehicle 100 according to the present disclosure, may perform the cleaning delay using the fluid (i.e., the washer liquid) through the delayed nozzle spraying by the controller 50. The cleaning operation variable control also may perform the air cleaning instead of using the washer liquid through the nozzle air spraying. The cleaning operation variable control may also not perform the cleaning through the nozzle non-spraying condition due to the replacement of data of a blocked sensor with data from another sensor so that contamination of an object that may be contaminated by the scattered spray due to the sensor cleaning is reduced or prevented.

Effects of the present disclosure are as follows.

First, before a cleaning operation, by checking whether an object that may be contaminated is present in a scattering area on the basis of data of an installed sensor, determining whether to spray or not to spray, and selecting delayed cleaning and/or air cleaning, damage to external objects in a scattering zone caused by spraying can be minimized.

Second, by discriminating whether an object in the scattering area is vehicle or is not a vehicle, it is possible to achieve minimum damage to such external objects and rapid cleaning.

Third, when an object present in the scattering area is not a vehicle, a speed of the vehicle subject to sensor cleaning can be reduced and a sprayed fluid can be changed to air (air cleaning), or only the air cleaning can be performed when deceleration of the vehicle subject to sensor cleaning is not possible.

Fourth, on highways or vehicle-only roads where only vehicles are present, since the object in the scattering area is a vehicle, the cleaning can be performed using cleaning liquid and the vehicle location can be determined using map data.

Fifth, minimizing contamination of an object that may be contaminated in the scattering area is more effective during autonomous driving.

While the technical concept of the present disclosure has been described with reference to the accompanying drawings, it should be apparent to those of ordinary skill in the art that various changes and modifications can be made without departing from the spirit and scope of the present disclosure while not being limited to the embodiments disclosed herein. Accordingly, it should be noted that such alternations or modifications fall within the claims of the present disclosure, and the scope of the present disclosure should be construed on the basis of the appended claims.

What is claimed is:

1. A sensor cleaning control device based on recognition of an external object around a vehicle, the sensor cleaning control device comprising:

one or more sensors configured to detect an external object of a vehicle, a surrounding environment, or a vehicle status;

a sensing portion cover provided on each of the one or more sensors;

a nozzle configured to spray a fluid; and a controller configured to, when a blockage is detected on the sensing portion cover, recognize the external object and perform cleaning control for the blockage according to the external object before cleaning is performed on the blockage using the fluid, wherein the controller is configured to determine a fluid scattering area and whether the external object within the fluid scattering area is detected by a sensor other than a sensor where the blockage is detected on the sensing portion cover and is configured to determine whether to perform the cleaning or cleaning delay, and wherein the cleaning delay is performed by using the fluid through nozzle spraying delay when a speed of the vehicle is reduced or by using air through nozzle air spraying when the speed of the vehicle cannot be reduced.

2. The sensor cleaning control device of claim 1, wherein, when the external object is another vehicle, the cleaning is performed without delay.

3. The sensor cleaning control device of claim 1, wherein, when the location of the vehicle is on a vehicle-only road, the cleaning is performed without delay.

4. The sensor cleaning control device of claim 1, wherein the fluid is air and the cleaning is performed through air cleaning.

5. The sensor cleaning control device of claim 1, wherein a speed of the vehicle is reduced during the cleaning.

6. The sensor cleaning control device of claim 1, wherein, when a position of the external object is determined to be inside the fluid scattering area where the fluid would be scattered during the cleaning, the cleaning delay is performed.

7. The sensor cleaning control device of claim 6, wherein, when the object that is contaminated is a person, an animal, a bicycle, or a powered two-wheeler (PTW), data of another sensor other than the sensor where the blockage is detected replaces data of the sensor where the blockage is detected on the sensing portion cover.

8. The sensor cleaning control device of claim 1, wherein the one or more sensors include any one among a camera sensor, a radio detecting and ranging (RADAR) sensor, a light detecting and ranging (LIDAR) sensor, an imaging device, or an ultrasound generator.

9. A sensor cleaning control method based on recognition of surrounding objects around a vehicle, the sensor cleaning control method comprising:

detecting, by a controller, a blockage on a sensing portion cover provided on a sensor;

determining a necessity for cleaning in order to remove the blockage; and controlling a cleaning delay of a sensor cleaning system when an external object is detected in a fluid scattering area of the sensor cleaning system, wherein the controller is configured to determine the fluid scattering area and whether the external object within the fluid scattering area is detected by a sensor other than a sensor where the blockage is detected on the sensing portion cover and is configured to determine whether to perform the cleaning or the cleaning delay, and wherein the cleaning delay is performed by using a fluid through nozzle spraying delay when a speed of the vehicle is reduced or by using air through nozzle air spraying when the speed of the vehicle cannot be reduced.

10. The sensor cleaning control method of claim 9, wherein, when a location of the vehicle is on a vehicle-only road or the object that is detected within the fluid scattering area is another vehicle, the cleaning is performed without delay.

11. The sensor cleaning control method of claim 9, wherein a speed of the vehicle is reduced during the cleaning delay.

12. The sensor cleaning control method of claim 9, wherein, when the external object that is detected within the fluid scattering area is a person, an animal, a bicycle, or a powered two-wheeler (PTW), data of another sensor other than the sensor where the blockage is detected replaces data of the sensor where the blockage is detected on the sensing portion cover.

* * * * *